Dec. 13, 1938.   H. ALFARO   2,140,397
AIR COOLED INTERNAL COMBUSTION ENGINE
Filed Sept. 19, 1935   2 Sheets-Sheet 1
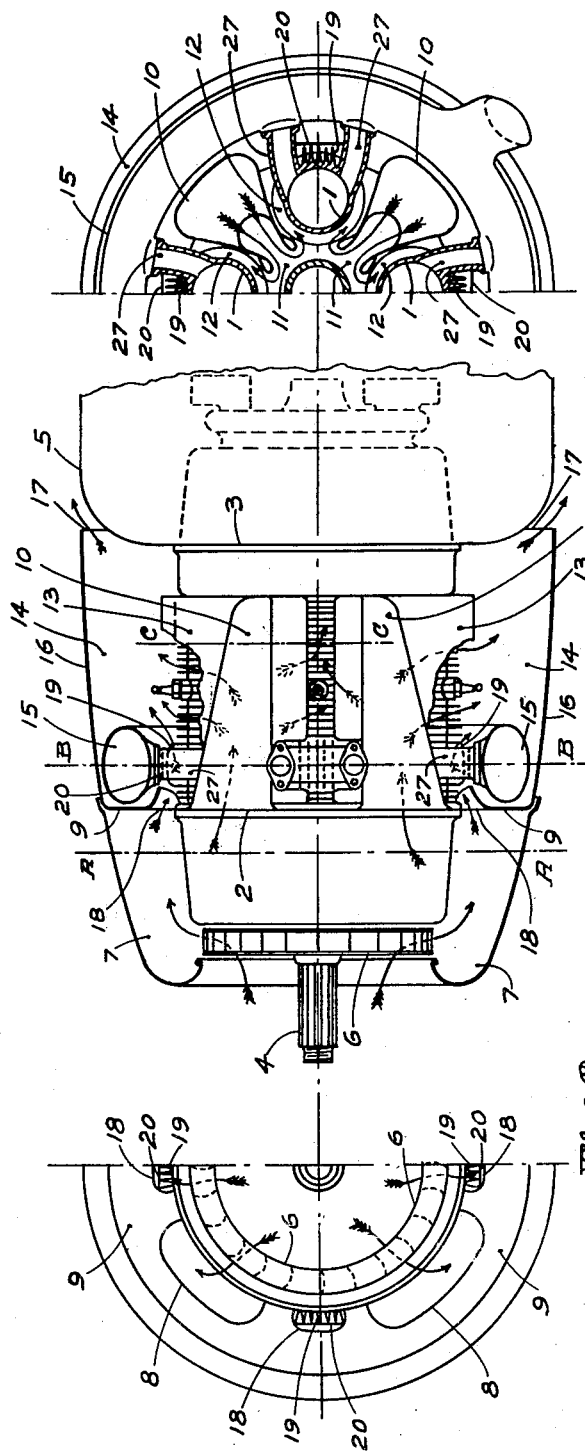
INVENTOR.
Heraclio Alfaro
BY
Evans & McCoy
ATTORNEYS INVENTOR.
Heraclio Alfaro
BY Evans & McCoy
ATTORNEYS Patented Dec. 13, 1938

2,140,397

UNITED STATES PATENT OFFICE 2,140,397

AIR-COOLED INTERNAL COMBUSTION ENGINE

Heraclio Alfaro, Boston, Mass.

Application September 19, 1935, Serial No. 41,284

18 Claims. (Cl. 123—171)

This invention relates to improvements in air cooling means for internal combustion engines which are particularly applicable to engines of the two-stroke-cycle variety.

The present invention involves improvements in the arrangement of heat radiating projections of the parts to be cooled, in the baffles or shrouding plates and cowlings, in the form and arrangement of the air passages and in the means to provide and control the air draft for cooling.

This invention is particularly applicable to engines of the two-stroke-cycle variety including engines of the loop scavenging type or of the two piston per cylinder type with uniflow scavenging and it may be used with spark ignition or compression ignition and also with direct fuel injection or with carburetor engines.

The main objects of this invention are to provide more efficient cooling means, to simplify manufacture, to reduce weight and to obtain a more compact construction.

Other advantages will be apparent to those skilled in the art to which this invention appertains.

Fig. 1 shows an air cooled engine of the crankless two-stroke-cycle type embodying my invention, the cowling being in section and the baffles and cylinders being shown in elevation.

Fig. 2 is a fragmentary cross section of the same engine taken on the line indicated at A—A in Fig. 1.

Fig. 3 shows a fragmentary section of said engine taken on the line indicated at B—B in Fig. 1.

Fig. 6 shows a fragmentary section through the cylinders and baffles taken on the line indicated at C—C in Fig. 1.

Fig. 7 shows, in fragmentary section, a slightly modified baffle arrangement.

Fig. 11 is a detail view showing a slot-controlling shutter.

Figure 5:
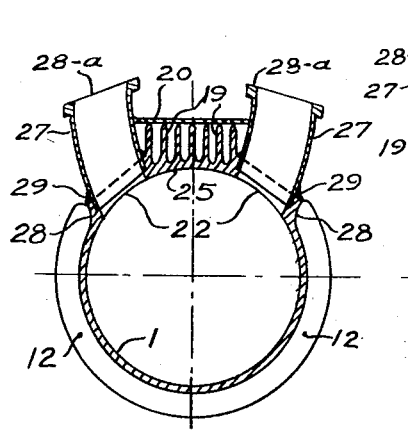
Fig. 5 shows a section taken on the line indicated at D—D in Fig. 4.

To improve efficiency in cooling I provide preferably forced air currents to all surfaces to be cooled so that no part is left without positive air circulation and that the more heated parts receive more intense air circulation. I prefer also to use baffles to direct said air properly and/or also a suction slot for the outlet of the cooling air.

The accompanying drawings show the invention applied to an aircraft engine of the general design shown and described in my patent applications, Serial #674,198 and 710,428 applied for on June 3, 1933 and February 9, 1934, respectively. Figures 1, 2 and 3 show the external part of the engine proper and the arrangement of the baffles, partitions, and cowlings to provide efficient cooling. As shown in these figures the engine has finned cylinders 1 mounted between walls 2 and 3 of the wabbler casings and arranged around a central shaft 4. The shaft 4 projects through the forward end of the housing and is arranged to drive a propeller in the usual way. The rear of the engine is covered by a cowling 5 which houses the usual engine accessories which are indicated in dotted lines. The shaft 4 carries a centrifugal fan 6 adjacent the front wabbler casing which is adapted to force air through the cooling system.

The engine is enclosed in a cowling which is spaced outwardly from the engine body and which overhangs the margin of the fan 6, permitting air to enter the fan and pass to a chamber 7 which extends around the forward wabbler casing. From the chamber 7, the air passes through openings 8 in a partition 9 which forms the rear wall of the chamber 7 into air troughs 10 as indicated by the arrows shown in the drawings. The air delivered into the air troughs 10 is directed to the space 11 interiorly of the group of cylinders 1. The cylinders are provided with fins 12 and two arcuate baffles 13 closely overlie the fins of each of the cylinders. The two baffles 13 of each cylinder cover the major portion of the cylinder but have their edges spaced apart to provide diametrically opposite openings, one to the interior space 11 and the other to an exterior chamber 14 surrounding the body of the engine. The troughs 10 span the spaces between baffles 13 of adjacent cylinders and with the baffles 13 form longitudinal air conduits open along their inner edges to the interior space 11. The air confined by the troughs 10 passes to the space 11 and thence into the channels between the fins 12 of the cylinder where it is confined by the baffles 13 until it reaches the openings to the exterior chamber 14, the air being thus caused to flow continuously between the fins throughout the major portion of the circumference of the cylinder. An exhaust manifold 15 in the form of a ring tube communicating with the exhaust ports of the cylinders is within the chamber 14 which surrounds the troughs 10 and extends from the partition 9 to the cowling 5. The rear end of the peripheral wall 16 of the chamber 14 terminates short of the cowling 5 providing a circumferential slot 17 through which air is discharged to the atmosphere. The cowling enclosing the chambers 7 and 14 and the cowling 5 form a streamlined housing enclosing all projecting parts of the engine thus reducing the engine drag when the engine is used on aircraft.

Air in its passage through the engine flows over substantially the entire surface of each cylinder and the exhaust ring 15 is cooled by the air in chamber 14, the fan 6 insuring a rate of air flow sufficient for effective cooling.

A particular advantage of using the rotary fan 6, when the engine is used to propel aircraft is to improve cooling when the aircraft is climbing with full power and the flying speed is low. Often the flying speed in climbing is insufficient to provide satisfactory cooling. The fan provides air pressure equivalent to that which would be provided at a higher flying speed. Some power will be expended on the cooling fan; this power will correspond to the work done by the fan on the air to compress it. At high flying speeds the fan will do little work, if any, on the onrushing air which will have sufficient energy of its own, therefore the power absorbed by the fan will be negligible. The rushing air past cowling 16 will also create a suction on slot 17 which will cooperate with fan 6 to intensify the circulation of the cooling air. If desired this slot can be provided with a shutter 17a that can be adjusted to regulate the cooling as is shown in Fig. 11.

As shown in Fig. 2 a number of holes 18 are provided in the partition 9 through which part of the cooling air is allowed to flow. These holes open to the spaces between the exhaust ports of the cylinders 1. These spaces or bridges are provided with short fins 19 (shown also in Figs. 3, 4, and 5) which extend longitudinally of the cylinders, and baffle plates 20 confine the air to the channels between the fins 19. The air rushing from chamber 7 to chamber 14 through the holes 18 is thus forced to pass between the fins 19 and cools the bridges between the ports which otherwise would be likely to get too hot.

Figure 4:
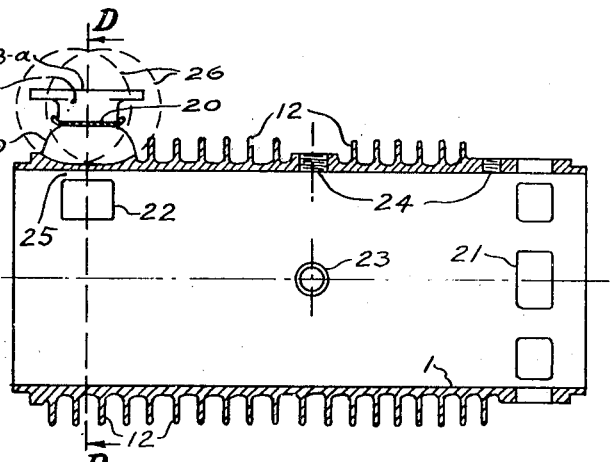
Fig. 4 shows one of the cylinders in longitudinal section.

The air-cooled cylinders 1 may, as shown in Figs. 4 and 5 be formed in one piece and the fins 12 and 19 may be formed by machining operations. Intake ports 21 are provided near one end of the cylinder and exhaust ports 22 near the other end. One or more openings 23 are threaded to receive the spark plugs and one or more openings 24 can be provided for the fuel injection valve or valves, if used. The ports 22 are sufficiently separated from each other to allow relatively wide bridges 25 between them. On these bridges fins 19 are provided. These fins may also be machined from the same block as the cylinder barrel but lengthwise to the cylinder and substantially in a perpendicular direction to fins 12. This can be performed with a milling cutter 26 as shown in dotted lines in Fig. 4. Exhaust ducts 27 are independent parts preferably permanently secured by welding or brazing to the cylinder proper and to plates or flanges 28a by which they may be connected to the exhaust manifold.

The construction of ducts 27 and their form of connection to the body of cylinder 1 is of particular importance. As shown in Fig. 5, exhaust ducts 27 should preferably be built with as thin a wall as may be practical and be made of oxide resisting material. Non-oxidating material will increase the life of a very thin walled exhaust duct and its thin wall will allow little transference of heat by conduction from the body of the duct proper back into the cylinder. Ducts 27 are inserted in a very light machined socket 28 formed in the cylinder and are brazed at 29 to provide a rigid connection.

This connection avoids bulky heat storing parts near the cylinder wall such as necessary for ordinary threaded or bolted connections and eliminates the cooling difficulties incident to the use of such threaded or bolted connections.

Figure 8:
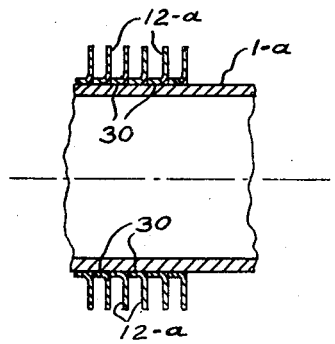
Fig. 8 shows a modified cylinder construction.

Another form of cylinder construction that in certain cases may be advantageous is shown in Fig. 8 in which the cylinder 1a is provided with attached fins 12a. Fins 12a are in the form of rings made of thin metal and are flanged along their whole periphery or in part, as shown at 30 so as to space the fins properly as they are assembled upon the cylinder 1a. To secure said fins to cylinder 1a, I prefer to braze them to the cylinder by any means as for instance by placing a wire of brass or other melting metal next to the joints to be welded and immersing the complete cylinder and fin assembly in an atmosphere of hydrogen at suitably high temperature.

Figure 9:
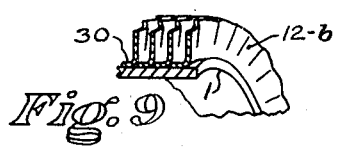
Fig. 9 shows a construction similar to that shown in Fig. 8 in which fins of modified form are provided.

Fins 12a may also be made from a continuous L-shaped metal strip coiled helically on cylinder 1 and brazed to it. Fins 12a may be fringed by bending the edges thereof to a wavy contour as shown in Fig. 9 at 12b so as to increase the air turbulence between fins and improve cooling.

For a construction such as described and shown in Figs. 8 and 9, I would prefer to select the materials used as follows: I would build the cylinder proper out of forged steel or cast iron or steel of any suitable kind or alloy that would provide low friction and high life characteristics to the inner face of the cylinder, and that would have good brazing characteristics. I would make the fins of copper or steel or any other good heat conducting material that could be easily stamped to the desired form and brazed to the cylinder without melting or burning.

If the piston surface, rubbing on the inner face of the cylinder, is of cast iron or of aluminum I would prefer to make the cylinder of forged steel. If the piston is of forged steel, I would make the cylinder of cast nickel-iron or cast steel that would have good rubbing characteristics with a forged steel piston. It should be understood that pistons built of sheet steel are considered as equivalents of forged steel pistons.

Figure 10:
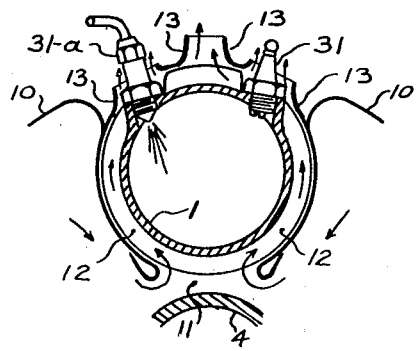
Fig. 10 shows the means employed for cooling the fuel injection valves and the spark plugs.

In order to cool the spark plugs and the fuel injection nozzles satisfactorily it will be desirable in some cases to provide air draft about said parts as shown in Fig. 10 where spark plugs 31 and injection nozzle 31a extend through apertures in the baffle plates 13 so as to allow some of the cooling air to escape about the plugs and nozzles.

It will be seen that I have provided more efficient means of construction for two-cycle engines and particularly for "barrel" type engines. The arrangement of fan and baffles shown increases the cooling efficiency. The various methods of construction disclosed simplify manufacture.

The design of the parts as described lends itself to lightness and compactness.

Figure 12:
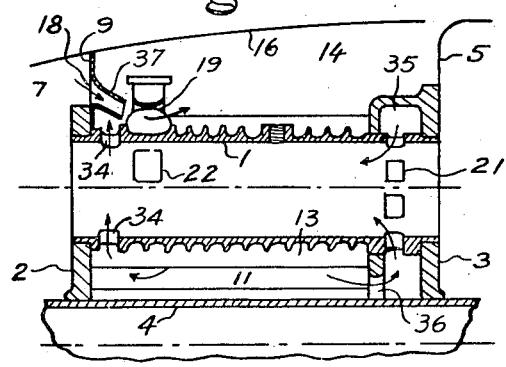
Fig. 12 is a fragmentary longitudinal section showing a modified construction by which a portion of the air from the collecting chamber is utilized for cooling the pistons and scavenging the cylinders.

Fig. 12 of the drawings shows an engine embodying the invention slightly modified to utilize a portion of the air delivered from the collecting chamber into the central space 11 for scavenging the cylinders and cooling the pistons. The air circulating system is the same as that shown in Figs. 1 and 2. In this instance, however, each cylinder is provided with diametrically opposite openings 34 between the exhaust openings 22 and the forward end of the cylinder and the cylinder supporting casing is provided with an annular cavity 35 surrounding the openings 21, the cavity 35 having an opening 36 to the space 11 so that air may pass from the space 11 into the cavity 35 and through the openings 21 into the cylinder. Air may also pass into the inner opening of each cylinder through passages in a piston to the outer opening 34 to cool the piston, it being understood that a piston will be employed which is provided with transverse air passages for cooling purposes, such for example, as the air-cooled piston disclosed in my application Serial No. 710,428 filed February 9, 1934. To conduct air from the collecting chamber 7 to the fins 19 between the exhaust outlets, short nozzles 37 are provided at the openings 18 each of which extends from the partition 9 to a point closely adjacent the fins 19.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In air-cooled barrel engines, a plurality of cylinders spaced circumferentially around a central axis and substantially parallel to it, an air-collecting chamber, ducts arranged between the cylinders to carry air from said chamber to the central space about which the cylinders are grouped, and means to direct said air over the surfaces of the cylinders.

2. In air-cooled barrel engines, a plurality of cylinders spaced circumferentially around a central axis and substantialy parallel to it, an air-collecting chamber, ducts arranged between the cylinders to carry air from said chamber to the central space about which the cylinders are grouped, a second chamber having a discharge outlet, and means to direct the air outwardly from said central space over the surface of each of the cylinders, into the latter chamber.

3. In aircraft air-cooled barrel engines, a plurality of cylinders spaced circumferentially around a central axis and substantially parallel to it, an air-collecting chamber, ducts arranged between the cylinders to carry air from said chamber to the central space about which the cylinders are grouped, a second chamber provided with a suction slot through which the air is discharged to the atmosphere, and means to direct the air outwardly from said central space over the surface of each of the cylinders, into the latter chamber.

4. In air-cooled barrel engines, a plurality of cylinders spaced circumferentially around a central axis and substantially parallel to it, an air-collecting chamber, ducts arranged between the cylinders to carry air from said chamber to the central space about which the cylinders are grouped, a second chamber having a discharge outlet, means to direct the air outwardly from said central space over the surface of each of the cylinders, into the latter chamber, and means to control the air draft through said air carrying ducts.

5. In air-cooled barrel engines, a plurality of cylinders spaced circumferentially around a central axis and substantially parallel to it, a chamber, mechanical means to force air into said chamber, ducts arranged between the cylinders to direct air from said chamber to the central space about which the cylinders are grouped and means to direct said air outwardly from said central space over the surface of each of the cylinders.

6. In air-cooled barrel engines, a plurality of cylinders spaced circumferentially around a central axis and substantially parallel to it, a chamber, mechanical means for compressing air in said chamber and for forcing air from the chamber into the central space about which the cylinders are grouped, and means to direct said air outwardly from said central space over the surface of each of the cylinders.

7. In air-cooled barrel engines a plurality of cylinders arranged circumferentially around a central axis and substantially parallel to said axis, exhaust openings in said cylinders, the walls of the cylinders being provided with fins between said openings, an air-collecting chamber, ducts arranged to direct air from said chamber to said finned portions, other ducts arranged between the cylinders to direct air from said chamber inwardly to the central space about which the cylinders are grouped, and means to direct said air outwardly from said central space over the surfaces of the cylinders.

8. In an internal combustion engine of the two stroke cycle type, an air-cooled cylinder having external fins and provided with exhaust openings intermediate its ends which are spaced apart in circumferential alinement and adapted to be masked and unmasked by a piston within the cylinder, certain of said fins being located between the exhaust openings.

9. In an internal combustion engine of the two stroke cycle type, an air-cooled cylinder having external fins and provided with exhaust openings intermediate its ends which are spaced apart in circumferential alinement and adapted to be masked and unmasked by a piston within the cylinder, certain of said fins being located between the exhaust openings, and means for causing air to flow between the last mentioned fins.

10. A barrel engine having a main shaft and air-cooled cylinders which are spaced around and substantially parallel to the main shaft, each cylinder having external fins, circumferentially spaced lateral exhaust openings in each cylinder adapted to be masked and unmasked by a piston in the cylinder, certain of the fins of each cylinder body being located between said openings, an air-collecting chamber, a blower actuated by said main shaft for forcing air into said air-collecting chamber, ducts arranged between the cylinders to direct air from said collecting chamber to the central space about which the cylinders are grouped, means to direct said air outwardly from said central space past the finned surfaces of the cylinders, and means to direct air from the air-collecting chamber to the fins between the exhaust openings of the cylinders.

11. In an internal combustion engine of the two stroke cycle type, an air-cooled cylinder provided with external fins disposed perpendicularly to the longitudinal axis of the cylinder, said cylinder having circumferentially spaced exhaust openings intermediate its ends which are adapted to be masked and unmasked by a piston in the cylinder and additional fins on the portion thereof between said exhaust openings, the said additional fins being disposed substantially parallel to the longitudinal axis of the cylinder.

12. In internal combustion engines of the two stroke cycle type, an air-cooled cylinder having circumferential fins, circumferentially spaced exhaust openings intermediate its ends which are adapted to be masked and unmasked by a piston in the cylinder and longitudinal fins between said openings.

13. In an aircraft engine a plurality of cylinders spaced about a central axis and parallel to it, an air-collecting chamber, means for conducting air from said collecting chamber to the central space about which the cylinders are grouped, means associated with each cylinder for directing air outwardly from said central space over the surface of the cylinder and a cowling around the engine forming an exterior chamber into which the air is delivered after passing over the cylinders from said central space, said chamber being provided with a rearwardly directed suction slot.

14. An air-cooled engine comprising parallel cylinders spaced around a central axis, said cylinders having circumferential fins, arcuate baffles disposed in the spaces between cylinders and overlying opposite sides of each cylinder, said baffles closely overlying the circumferential fins, the two baffles overlying each cylinder having their edges spaced apart to provide interior and exterior slots for ingress and egress of air, plates bridging the spaces between baffles of adjacent cylinders to provide ducts opening to the central space about which the cylinders are grouped, and an air-collecting chamber communicating with said ducts.

15. A barrel engine comprising cylinders spaced circumferentially about a central axis, each cylinder having external circumferential fins, circumferentially spaced exhaust ports and longitudinal fins disposed between said exhaust ports, an air-collecting chamber, means for conducting air from said collecting chamber to the central space about which the cylinders are grouped, means for directing currents of air along the circumferential fins from said central space, and means for directing currents of air along said longitudinal fins from said air-collecting chamber.

16. A barrel engine comprising a shaft, cylinders substantially parallel with the shaft and spaced apart around the shaft, an exhaust manifold in the form of a ring surrounding the shaft, spaced ducts connecting each cylinder to the manifold, a cowling enclosing the cylinders and manifold, said cowling projecting forwardly beyond the cylinder and having an opening around said shaft, a partition at the forward end of the cylinders providing an air-collecting chamber forwardly of the cylinders, passages opening through said partition for conducting air from the air-collecting chamber to the central space about which the cylinders are grouped, passages from said central space to the space between the cowling and cylinders, said partition having other openings through which air flows into the spaces between said exhaust ducts.

17. In air cooled barrel engines, a plurality of cylinders arranged circumferentially around a central shaft and substantially parallel to it, the walls of said cylinders being provided with fins, an air collecting space between these cylinders and shaft, baffles to direct said air between the fins of the cylinders outwardly from said collecting chamber, ignition means in each cylinder and an opening in the baffle of each cylinder around the ignition means whereby part of the outgoing air may escape.

18. In air cooled barrel engines, a plurality of cylinders arranged circumferentially around a central shaft and substantially parallel to it, the walls of said cylinders being provided with fins, an air collecting space between these cylinders and shaft, baffles to direct said air between the fins of the cylinders outwardly from said collecting chamber, fuel injection means in each cylinder and an opening in the baffle of each cylinder around the fuel injection means whereby part of the outgoing air may escape.

HERACLIO ALFARO.